United States Patent [19]
Nordström et al.

[11] Patent Number: 5,616,193
[45] Date of Patent: Apr. 1, 1997

[54] PNEUMATIC TIRES WITH COOPERATING TRACK

[75] Inventors: Erik G. S. Nordström, Trelleborg; Carl-Gustav B. C. Victor, Höllviksnäs, both of Sweden

[73] Assignee: Trelleborg AB, Trelleborg, Sweden

[21] Appl. No.: 281,013

[22] Filed: Jul. 27, 1994

Related U.S. Application Data

[63] Continuation of Ser. No. 892,033, filed as PCT/SE91/00403, Jun. 5, 1991, Pat. No. 5,388,624.

[30] Foreign Application Priority Data

Jun. 5, 1990 [SE] Sweden .................................. 9002014

[51] Int. Cl.⁶ .......................... B60B 15/18; B60C 13/00; B60C 1/00
[52] U.S. Cl. .......................... 152/185.1; 152/525; 305/15; 305/19; 305/184; 305/194
[58] Field of Search .............................. 152/209 R, 501, 152/450, 153, 157, 158, 516, 520, 521, 548, 564, 525; 428/424.8, 519, 521, 908.8; 305/15, 19, 184, 194

[56] References Cited

U.S. PATENT DOCUMENTS

| | | | |
|---|---|---|---|
| 2,040,645 | 5/1936 | Dickinson | 152/521 X |
| 2,776,699 | 1/1957 | Kindle et al. | 152/564 X |
| 2,798,526 | 7/1957 | Peterson et al. | 152/564 |
| 2,981,304 | 4/1961 | Barton et al. | 152/564 |
| 2,987,093 | 6/1961 | Urbon | 152/521 X |
| 3,178,402 | 4/1965 | Smith et al. | 152/564 X |
| 3,589,424 | 6/1971 | Sasaki et al. | 152/564 X |
| 3,937,862 | 2/1976 | Dillenschneider | 152/564 X |
| 4,007,769 | 2/1977 | Powell et al. | 152/521 |
| 4,481,995 | 11/1984 | Ogawa et al. | 152/374 X |
| 4,641,670 | 2/1987 | Poque et al. | 152/521 X |
| 4,843,120 | 6/1989 | Halasa et al. | 152/450 X |
| 4,857,397 | 8/1989 | Mowdood et al. | 428/519 X |
| 4,886,850 | 12/1989 | Ogawa et al. | 152/525 X |

FOREIGN PATENT DOCUMENTS 2658049  7/1978  Germany .

*Primary Examiner*—Michael W. Ball
*Assistant Examiner*—Francis J. Lorin
*Attorney, Agent, or Firm*—Beveridge, DeGrandi, Weilacher & Young, L.L.P.

[57] ABSTRACT

A vehicle drive includes pneumatic tires mounted on rims and includes a track which is engaged by and cooperates with the tires. Tire-supporting elements on the track position the tires on the track. Also, the tires, on at least the surfaces which come into contact with the tire-supporting elements, have an outer rubber layer which has a high wear resistance and low friction properties and in which 50–100% is butadiene rubber.

1 Claim, 2 Drawing Sheets

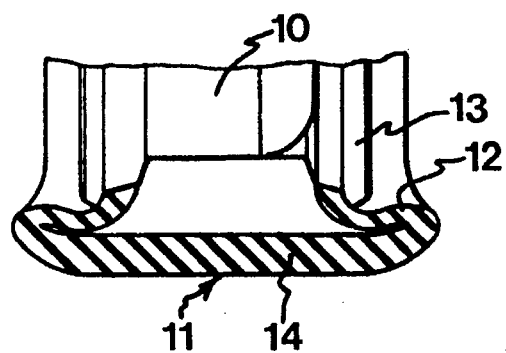
FIG.1
PRIOR ART
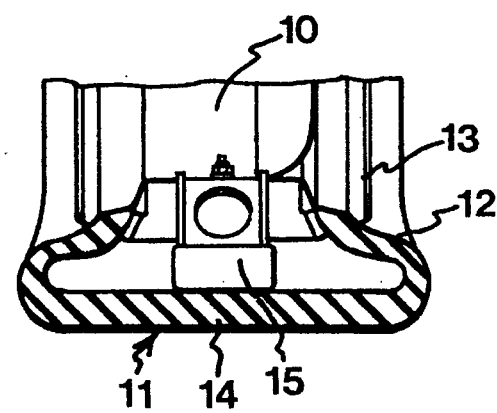
FIG.2
PRIOR ART
FIG.3
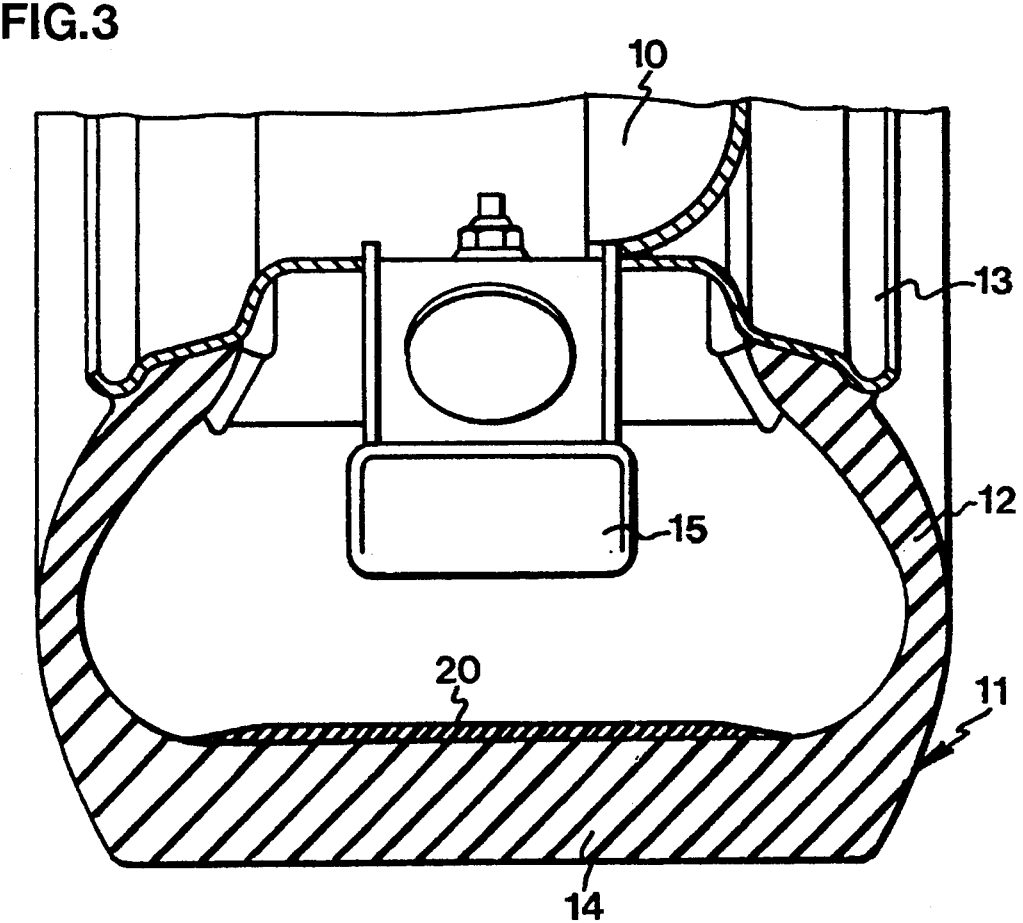

PNEUMATIC TIRES WITH COOPERATING TRACK

REFERENCE TO RELATED APPLICATION

This is a continuation of U.S. patent application 07/829,033, filed as PCT/SE91/00403, Jun. 5, 1991, now U.S. Pat. No. 5,388,624.

BACKGROUND OF THE INVENTION

The present invention relates to a pneumatic tyre intended for use on a rim with an emergency-driving device, and/or in a vehicle drive where the pneumatic tire supports and drives a track.

For instance U.S. Pat. Nos. 3,028,900, 4,183,388 and 4,258,767 disclose emergency-driving wheels which are based on the provision of an inner supporting device or inner wheel serving to prevent a deflated tire from collapsing entirely. Such a supporting device reduces deformation of the tire sides, and thus considerably prolonges the distance that the tire can run flat. However, emergency driving with an empty tyre mounted on a rim with an emergency-driving device suffers from the disadvantage that the supporting device or inner wheel is of smaller circumference than the tire, resulting in a relative movement between the inside of the tire and the emergency-driving device. Such relative movement or slipping wears the inside of the tire which thus is rapidly worn down from within, with the risk that the tire may split up in the radial plane or the tread of the tire come loose so that continued driving usually becomes impossible.

In the above US patent specifications, it is suggested that a rubber layer be arranged on the outer tread of the emergency-driving device or an inner emergency-driving device made of nothing but rubber or plastic be provided. An alternative is to coat the inside of the tire with a low-friction layer of ethylene polyterephthalate or a suitable lubricant (U.S. Pat. No. 4,007,769 and SE-B-379,313) which is either applied to the inside of the tire when the wheel is mounted or distributed thereon when the tire becomes flat. In some cases, this distribution may be carried out by the lubricant being discharged from a container arranged in the wheel and designed to break at the occasion of emergency driving.

The use of emergency-driving devices of the type described in U.S Pat. No. 3,028,900 has shown that a large amount of heat is generated by the wear or slipping between the rubber layer arranged on the emergency-driving device and the inside of the pneumatic tire. With the rapid build-up of heat, there is a risk that the tire rapidly catches fire and is destroyed. This risk is probably less pronounced when the coating on the emergency-driving device or the inside of the tire consists of a layer of polytetrafluoroethylene, but the risk still remains.

In tests, the use of lubricants in the tire has given excellent results in emergency driving on consolidated roads. Tires equipped with emergency-driving devices are, however, mostly intended for cross-country vehicles, such as military vehicles. Thus, in emergency driving with punctured tires in e.g. deserts or other extremely dry and dusty areas, the lubricant dries very quickly, probably since it takes up the fine-grained dust in the surroundings. As a result, the lubricating effect is rapidly lost, and the tire is destroyed as if there had been no lubricant at all. The provision of ethylene polyterephthalate layers on the emergency-driving device or on the inside of the tire is impaired by the same drawback, since ethylene polyterephthalate has a poor wear resistance and thus cannot withstand the wear caused by dust and other solid particles penetrating into the punctured tire.

A further difficulty encountered in vehicle drives of the type comprising pneumatic tires and a track running over the tires and driven thereby in order to propel the vehicle, is the wear of the tire portions which come into contact with tire-supporting elements serving to position the tires in relation to the track. This is especially pronounced under hot and/or dry conditions.

The present invention aims at providing a pneumatic tire which has a higher resistance to inner or outer wear and, consequently, has a longer service life. The invention further aims at providing a wheel structure comprising a rim on which a pneumatic tire is mounted, and an inner wheel for emergency driving which is mounted on the rim in the pneumatic tire, said wheel structure being designed so as to acquire better emergency-driving properties, especially in deserts and other dry and dusty areas, than prior art wheel structures of this type.

In addition, the invention aims at providing a vehicle drive comprising a track and pneumatic tyres which cooperate therewith, said vehicle drive having a longer service life than prior art vehicle drives of this type.

SUMMARY OF THE INVENTION

These and other aims of the invention are achieved by a pneumatic tire having an inner and/or an outer layer with low-friction properties, said tire being characterised in that said layer is a rubber layer which has a high wear resistance and in which 50–100% of the polymer material is butadiene rubber. When the invention is applied to pneumatic tires intended to be mounted on rims with an emergency-driving device of the type mentioned above, the low-friction rubber layer is arranged on the inside of the tire body, at least opposite to the inner wheel of the emergency-driving device. When the pneumatic tire is tubeless and has an air-sealing layer of butyl rubber, the low-friction rubber layer may be arranged either on the inside of the butyl rubber layer or between this layer and the tire body.

When the pneumatic tire is to be used as a driving or supporting wheel for tracks with tire-supporting elements, the low-friction rubber layer should, according to the invention, be arranged on the outside of the tire sides, at least in the areas which come into contact with the tire-supporting elements.

According to the invention, the low-friction rubber layer consists of butadiene rubber, optionally with a minor addition of natural rubber and/or styrene-butadiene rubber in an amount less than 50% of the polymer material, i.e. the amount of natural rubber and/or styrene-butadiene rubber should be less than one part by weight per part by weight of butadiene rubber.

DE-A-2,658,049 discloses an emergency-driving tire which, on its inside, is provided with an extra rubber layer having a hardness of 65–85 Shore A and formed from a mixture of styrene-butadiene rubber and butadiene rubber, in which case more than 50% should be synthetic rubber and the synthetic-rubber mixture should contain more than 10% styrene. In addition, the rubber mixture may contain natural rubber. According to this specification, it is preferred that the hardness is in the upper range of the hardness scale indicated. This specification points away from the invention, stating as it does a different rubber mixture which does not chiefly consist of butadiene rubber.

SE-B-397,305 discloses a tire which, on its inside, is provided with a protective rubber layer having a specified tear strength of at least 90 kp/cm. By way of example, mention is made of a rubber mixture consisting mainly of natural rubber and a minor amount of styrene-butadiene rubber. This specification teaches away from the invention by requiring a rubber mixture of high tear strength, whereas an addition according to the invention of a large amount of butadiene rubber reduces the tear strength.

BRIEF DESCRIPTION OF THE DRAWINGS

The invention will now be described in more detail below, reference being had to the accompanying drawings, in which FIG. 1 illustrates the deformation of a pneumatic tire when used for emergency driving in flat condition.

FIG. 2 is an analogous view showing the tire mounted on a rim with an emergency-driving device, FIG. 3 is a sectional view of a pneumatic tire according to the invention, which is mounted on a rim with an emergency-driving device.

DESCRIPTION OF THE PREFERRED EMBODIMENTS

Figure 6:
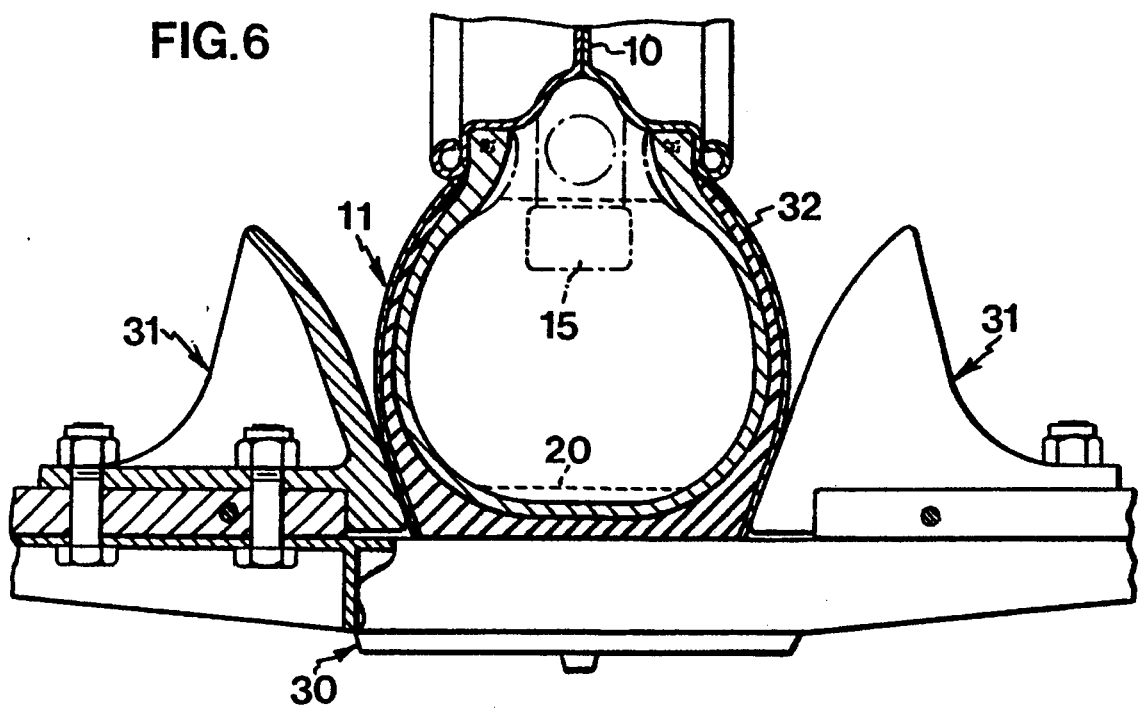
FIG. 6 is a sectional view of a vehicle drive with tracks and tires.

FIG. 1 shows a rim 10 on which a pneumatic tire 11 is mounted. The pneumatic tire is flat, and when the vehicle is propelled, the tire sides 12 will bend outwards and be pressed against the tread 14 of the tire by the rim edges 13. This not only entails a substantial deformation, but also relative movements owing to the diameter of the rim being smaller than the normal diameter of the tire. Driving with flat tires thus rapidly results in the tire sides being cut to pieces by the rim edges.

FIG. 2 also illustrates the prior art. In this case, the rim 10 is equipped with an inner emergency-driving device 15 in the form of an extra wheel-rim which may be made of steel or be designed in accordance with any one of the above-mentioned US patent specifications. In this case, the inner ring 15 will act upon the inside of the tire body 14, thereby relieving the pressure on the tire sides 12. As mentioned earlier, also such emergency driving rapidly wears down the tire.

FIG. 3 illustrates a wheel structure comprising a pneumatic tire according to the invention. This embodiment thus consists of a wheel structure including the rim 10 and, mounted thereon, the pneumatic tire 11, as well as an inner wheel 15 for emergency driving mounted on the rim in the pneumatic tire. The inner wheel or extra wheel-rim is made of steel or any other suitable metal. According to the invention, the pneumatic tire has an inner layer 20 made of low-friction rubber of high wear resistance. Thus, the layer 20 is located between the tire body and the inner wheel 15.

Figure 4:
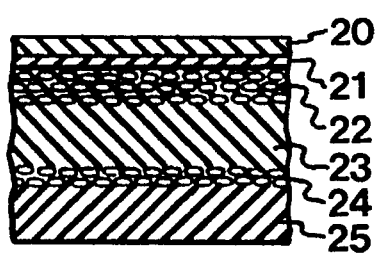
FIGS. 4 and 5 illustrate two embodiments of a vehicle tire intended for use with an emergency-driving device as shown in FIG. 3.

FIG. 4, which illustrates a possible placement of the layer 20, is a sectional view of a portion of the tire and its tread. In this case, the layer 20 is arranged on the inside of the tire, inwardly of a butyl rubber layer 21 serving as air-sealing layer. The layer 21 is applied to the inside of the tire body 22. On the outside of the tire body 22, there are arranged a tiegum layer 23, a breaker strip 24, and the tread 25 proper.

Figure 5:
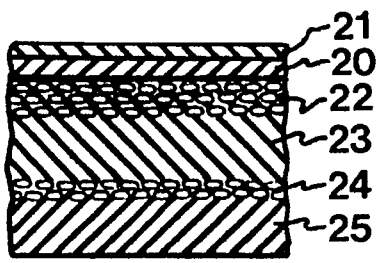

FIG. 5 illustrates that, according to the invention, the low-friction rubber layer 20 may also be arranged between the butyl-rubber layer 21 and the tire body 22. The various layers bear the same reference numerals in FIGS. 4 and 5.

Figure 7:
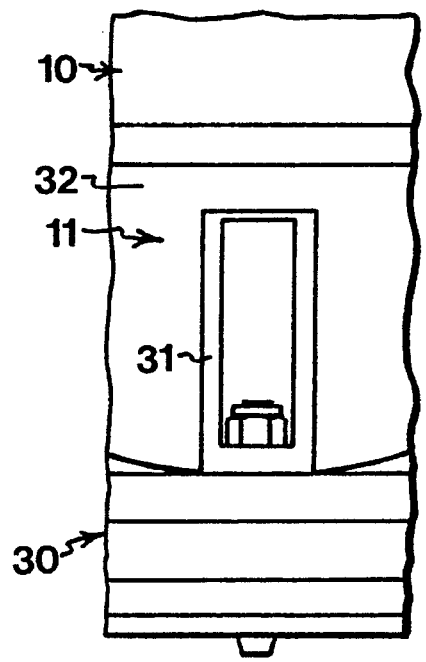
FIG. 7 is a side view of a small portion of the vehicle drive.

FIG. 6 illustrates a vehicle drive comprising tires 11 which are mounted on rims 10 and serve to drive a track 30. Further, tire-supporting elements 31 are fixed to the inside of the track 30 and serve to position the latter in relation to the vehicle tires 11. The invention employs a pneumatic tire which, on its outside, has a low-friction rubber layer with a high wear resistance in the areas which come into contact with the tire-supporting elements 31. This layer is designated 32 in FIGS. 6 and 7.

As indicated by dash lines in FIG. 6, an emergency-driving device of the type illustrated in FIG. 3 can be used also in this vehicle drive. If so, the pneumatic tire is provided with a low-friction rubber layer 20 on its inside, corresponding to FIGS. 3–5.

According to the invention, the low-friction rubber layer is made of butadiene rubber, optionally with an addition of natural rubber and/or styrene-butadiene rubber in an amount less than one part by weight per part by weight of butadiene rubber. The table below illustrates the composition of a suitable low-friction rubber material, as well as a preferred embodiment of such a material, expressed in parts per hundred of rubber ("phr").

| MATERIAL | Low-Friction Rubber RANGE PHR | PREFERRED PHR |
| --- | --- | --- |
| Rubber in total | 100 | 100 |
| whereof | | |
| Butadiene rubber (BR) | >50 | 40 BR |
| Natural rubber (NR) and/or | >50 | 60 NR |
| Styrene-butadiene rubber (SBR) | | |
| Peptiser | 0–0.15 | 0.07 |
| Intensifying carbon black (ISAF) | 40–80 | 60 |
| Processing oil | 0–30 | 10 |
| Processing aid | 1–6 | 3.35 |
| Antiozonant | 1–4 | 2 |
| Antioxidant | 1–3 | 1 |
| Ozone-proof wax | 1–3 | 2 |
| Zinc oxide | 2–8 | 4 |
| Stearic acid | 0.5–3 | 2 |
| Accelerating agent | 0.5–3 | 1.2 |
| Retarding agent | 0.1–0.5 | 0.2 |
| Soluble or insoluble sulphur | 0.5–3 | 2 |

As peptiser, one may advantageously use pentachlorothiophenol, e.g. RENASIT-VII (Rhein-Chemie, Mannheim, Germany). The processing oil employed is suitably a high-aromatic mineral oil, and the processing aid is a homogenising agent, advantageously STRUKTOL 40 MS which is a synthetic resin based on alkyl naphthalene and an aromatic compound with an alkyl group (Schill & Seilacher, Hamburg, Germany). A suitable antiozonant is 6-paraphenylene diamine, and e.g. a polar trimethyl dihydrochinoline may be used as antioxidant. As accelerating agent, one may use e.g. cyclohexyl benzothiazyl sulphonamide. A suitable retarding agent is n-(cyclohexyl phthalimide).

Although other low-friction rubber mixtures of high wear resistance may be employed, the most preferred mixtures are based on high concentrations of butadiene rubber.

We claim:

1. A vehicle drive comprising rims (10), pneumatic tires (11) mounted on said rims, a track (30) which is engaged by and cooperates with the tires, tire-supporting elements (31) on said track for positioning the tires on the track; said tires, at least in surface areas which come into contact with the tire-supporting elements, having an outer rubber layer (32) which has a high wear resistance and low-friction properties and in which 50–100% of the rubber layer is butadiene rubber.

* * * * *